Feb. 1, 1927.
F. KNAUST
1,616,262
SANITARY FOOD CONTAINER
Filed May 29, 1925
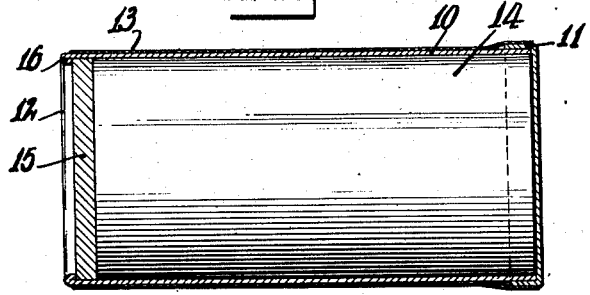
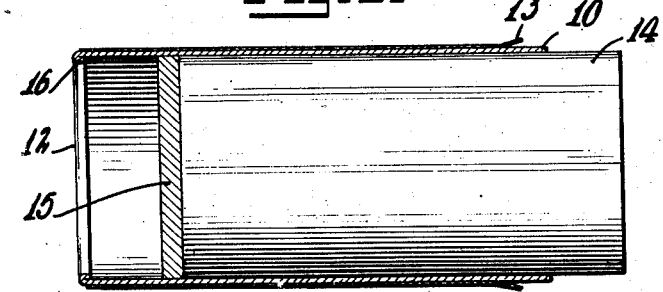
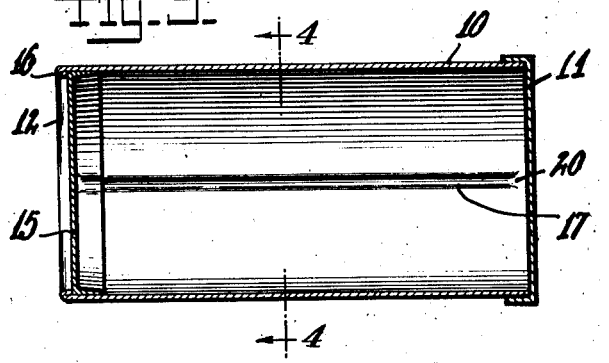 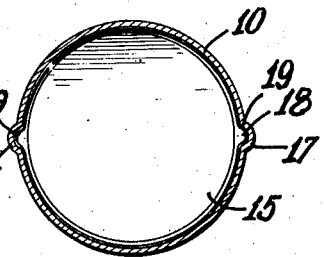
INVENTOR.
Frederick Knaust
BY
ATTORNEYS.

Patented Feb. 1, 1927.

1,616,262

UNITED STATES PATENT OFFICE.

FREDERICK KNAUST, OF BROOKLYN, NEW YORK.

SANITARY FOOD CONTAINER.

Application filed May 29, 1925. Serial No. 33,594.

This invention relates to improvements in containers such as cardboard containers for foods, or the like, as for instance, butter, cheese, fat, chopped raw meat, etc., and it is the principal object of the invention to provide a sanitary container allowing a gradual projection or advancing of the contents thereof from said container for cutting slices from said articles of food.

Another object of the invention is the provision of a container of simple and inexpensive construction adapted to preserve the contents in a sanitary and wholesome condition.

A further object of the invention is the provision of a container allowing a ready dispensing of its contents after the removal of its cover and the customary, advertisement bearing paper covering therefor.

A still further object of the invention is the provision of a sanitary container provided with guiding grooves ending at a certain distance from the cover, so as not to interfere with the smooth fitting of the same onto the container.

These and other objects and advantages of the invention will become more fully known as the description thereof proceeds, and will then be specifically pointed out in the appended claims.

In the accompanying drawing, forming a material part of this disclosure:

Fig. 1 is a sectional side elevation of the container, closed.

Fig. 2 is a view similar to Figure 1, with the container open and its contents partly projecting therefrom.

Fig. 3 is a sectional side elevation of a modified form of container.

Fig. 4 is a cross-section through the same on line 4—4 of Figure 3.

The container made of card-board or similar suitable material, has a substantially cylindrical shape and its body 10 is at one end closed by a cover 11 while its opposite end is open and provided with a marginal flange 12.

A paper cover 13 bearing advertisements etc., envelops body and cover and must be torn before the cover may be removed.

The contents 14, such as butter, cheese, etc., rest upon a movable bottom 15 within body 10, the outward movement of which is limited by a crimp 16 in the side walls, near the bottom flange thereof.

In the modified form of my device illustrated in Figures 3 and 4, the container has substantially the same construction as shown and described with respect to Figures 1 and 2, the only difference being the provision of lateral longitudinally extending grooves 17 engaged by the articles within the container as indicated at 18, while homogeneous ears 19 travel in the grooves 17, on the bottom part 15. The groove stop before the end of the container, as at 20, so as to form a resting place for the cover.

The operation of my device will be entirely clear from the above description, the butter, cheese, etc., are pressed into the container until the movable bottom engages the crimps 16 and the container is then closed and wrapped.

If it is desired to remove the contents, the paper envelope is broken and the cover removed, the movable bottom is then pressed forward and the cylindrical body of butter will be projected through the mouth of the container to a desired distance, to allow the cutting off of such quantity as desired, thereupon the cover is replaced.

It is to be understood that changes in the construction of the container as shown and described, by way of example, may be made, such as fall within the scope of the appended claims, without departure from the principle and spirit of the invention.

Having thus described my invention, what I claim as new, and desire to secure by Letters Patent, is:

1. A sanitary food container comprising a cylindrical body, a marginal bottom flange formed with said body at one end thereof, a movable bottom plate against which the food rests in said cylindrical body, said marginal flange being adapted to stop outward movement of said movable bottom, a cover, an envelope for the whole, and a means comprising outwardly extending ridges for guiding said food and movable bottom during the projection of the food from said body and for preventing said container from rolling.

2. A sanitary food container comprising a cylindrical body, longitudinal ridges extending outwardly from said body to prevent rolling thereof, said grooves ending at a distance from the mouth of said container, a bottom on which the food is supported, movably arranged within said container, a cover adapted to engage the end of said grooves, and means for limiting the displacement of said movable bottom comprising a marginal flange disposed around the end of said container.

In testimony whereof I have affixed my signature.

FREDERICK KNAUST.